(12) United States Patent
Seki

(10) Patent No.: US 7,673,890 B2
(45) Date of Patent: Mar. 9, 2010

(54) JOINT STRUCTURE FOR INDEPENDENT SUSPENSION

(75) Inventor: Bunzo Seki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 548 days.

(21) Appl. No.: 11/528,661

(22) Filed: Sep. 28, 2006

(65) Prior Publication Data

US 2007/0075516 A1 Apr. 5, 2007

(30) Foreign Application Priority Data

Sep. 30, 2005 (JP) ............................. 2005-287712

(51) Int. Cl.
*B60G 9/02* (2006.01)
(52) U.S. Cl. .................... 280/124.125; 280/124.111
(58) Field of Classification Search ................ 180/348, 180/215, 226, 254, 336, 370, 71.5, 781, 361, 180/364, 337, 350, 351, 357, 217, 231; 280/124.128, 280/124.13, 124.125, 124.153, 124.133, 280/722, 730, 93.502, 93.504, 93.507, 93.508, 280/93.51, 93.511, 124.111; 74/607; 474/114
See application file for complete search history.

(56) References Cited

U.S. PATENT DOCUMENTS

| | | | | | |
|---|---|---|---|---|---|
| 3,213,958 | A | * | 10/1965 | Muller | 180/55 |
| 4,699,234 | A | * | 10/1987 | Shinozaki et al. | 180/233 |
| 4,786,075 | A | * | 11/1988 | Takahashi | 180/254 |
| 5,052,534 | A | * | 10/1991 | Gustin et al. | 192/53.2 |
| 5,984,039 | A | * | 11/1999 | Mayr | 180/248 |
| 6,250,415 | B1 | * | 6/2001 | Seto | 180/337 |
| 6,286,619 | B1 | * | 9/2001 | Uchiyama et al. | 180/337 |
| 6,319,132 | B1 | * | 11/2001 | Krisher | 464/143 |
| 6,378,677 | B1 | * | 4/2002 | Kuroda et al. | 192/35 |
| 6,533,060 | B1 | * | 3/2003 | Seto | 180/337 |
| 6,761,662 | B2 | * | 7/2004 | Iwazaki et al. | 475/221 |
| 2007/0074925 | A1 | * | 4/2007 | Seki et al. | 180/374 |

FOREIGN PATENT DOCUMENTS

JP 63-90486 A 4/1988

\* cited by examiner

*Primary Examiner*—Paul N Dickson
*Assistant Examiner*—Karen Jane J Amores
(74) *Attorney, Agent, or Firm*—Birch, Stewart, Kolasch & Birch, LLP

(57) ABSTRACT

A joint structure for an independent system designed to improve the maintenance performance of a rear wheel suspension. Rear wheel axles extend leftward and rearward from a final case supported by the rear portion of a body frame to independently suspend respective left and right rear wheels. The respective rear wheel axles are coupled to left-hand and right-hand joints on the left and right sides, respectively, of the final case. A driven sprocket engaging with a chain is attached to the left-hand joint and a separate holder is detachably attached to the front of the final case. A joint-part shaft of the right-hand joint is supported by the final case via a bearing and also a brake disk is attached thereto. A male-shaped joint-part shaft integrally extending from the left-hand joint is fitted into the female-shaped joint-part shaft for integrally rotatable coupling.

18 Claims, 6 Drawing Sheets

JOINT STRUCTURE FOR INDEPENDENT SUSPENSION

CROSS-REFERENCE TO RELATED APPLICATION

The present application claims priority under 35 U.S.C. §119 to Japanese Patent Application No. 2005-287712, filed Sep. 30, 2005, the entire contents of which are hereby incorporated by reference.

BACKGROUND OF THE INVENTION

1. Field of the Invention

The present invention relates to a joint structure for an independent suspension and more particularly to a coupling structure advantageous to respective outer races constituting left and right joints.

2. Description of Background Art

Examples of a coupling structure for respective outer races constituting left-hand and right-hand joints in an independent suspension include the following structure: A joint-part shaft is provided for each of the outer races and fitted from the left and right to a tubular member formed with spline grooves on the internal surface thereof. Thus, the tubular member is spline coupled to the left-hand and right-hand joint-part shafts for spline coupling, whereby the left-hand and right-hand outer races are indirectly coupled to each other via the tubular member. (For example, see Japanese Patent Laid-Open No. Sho 63-90486.)

The structure for coupling the left-hand and right-hand outer races via the above-mentioned tubular member has a problem in that it is difficult to ensure a necessary wheel stroke because of the following: Since the left-hand and right-hand outer races are independently coupled to the tubular member, a lateral widthwise distance is increased according to the intervention of the tubular member, which may provide an excessive joint angle in a limited tread. Therefore, there arises a problem in that it is difficult to ensure a necessary wheel stroke.

SUMMARY AND OBJECTS OF THE INVENTION

To solve the above problem, according to a first aspect of the present invention, a joint structure for an independent suspension includes a transmission system final case supported by a body frame, and left-hand and right-hand driving wheels held by the body frame through left-hand and right hand suspension arms, respectively. The final case includes a driven portion to which a driving force of an engine is transmitted; and joints adapted to transmit the driving force from the driven portion to left-hand and right-hand axles, each joint having an outer race adapted to connect an end of the axle therewith swingably and a joint-part shaft extending from an axial center part of the outer race toward a counterpart joint. The left-hand and right-hand outer races are directly coupled to each other by coupling the respective joint-part shafts with each other.

According to a second aspect of the present invention, the left-hand and right-hand joint-part shafts are formed such that one is a male member and the other is a female member and are coupled to each other through a male-female fitting structure.

According to a third aspect of the present invention, one of the respective outer races of the left-hand and right-hand joints holds a brake disk and the other of the outer races holds a driven sprocket.

EFFECT OF THE INVENTION

According to the first aspect of the present invention, the intervention of a cylindrical member can be eliminated by directly coupling the outer races together. Therefore, a lateral width can be reduced according to the elimination. Furthermore, the number of component parts can be reduced.

According to the second aspect of the present invention, the left-hand and right-hand joint-part shafts are formed such that one is a male member and the other is a female member and are coupled to each other through fitting. Therefore, assembly can be simplified and the left-hand and right-hand outer races can be securely coupled to each other.

According to the third aspect of the present invention, members that hold the driven sprocket and brake disk are different from each other; therefore, the driven sprocket supporting part's deformation resulting from a chain's tensile force has no effect on the brake disk. Thus, the parts for supporting the driven sprocket and brake disk each need less rigidity. This can reduce the weight of the joints.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will below be described with reference to the drawings. Note that the directions such as the front, rear or back, left and right are based on the operating state of a vehicle unless otherwise noted.

Figure 1:
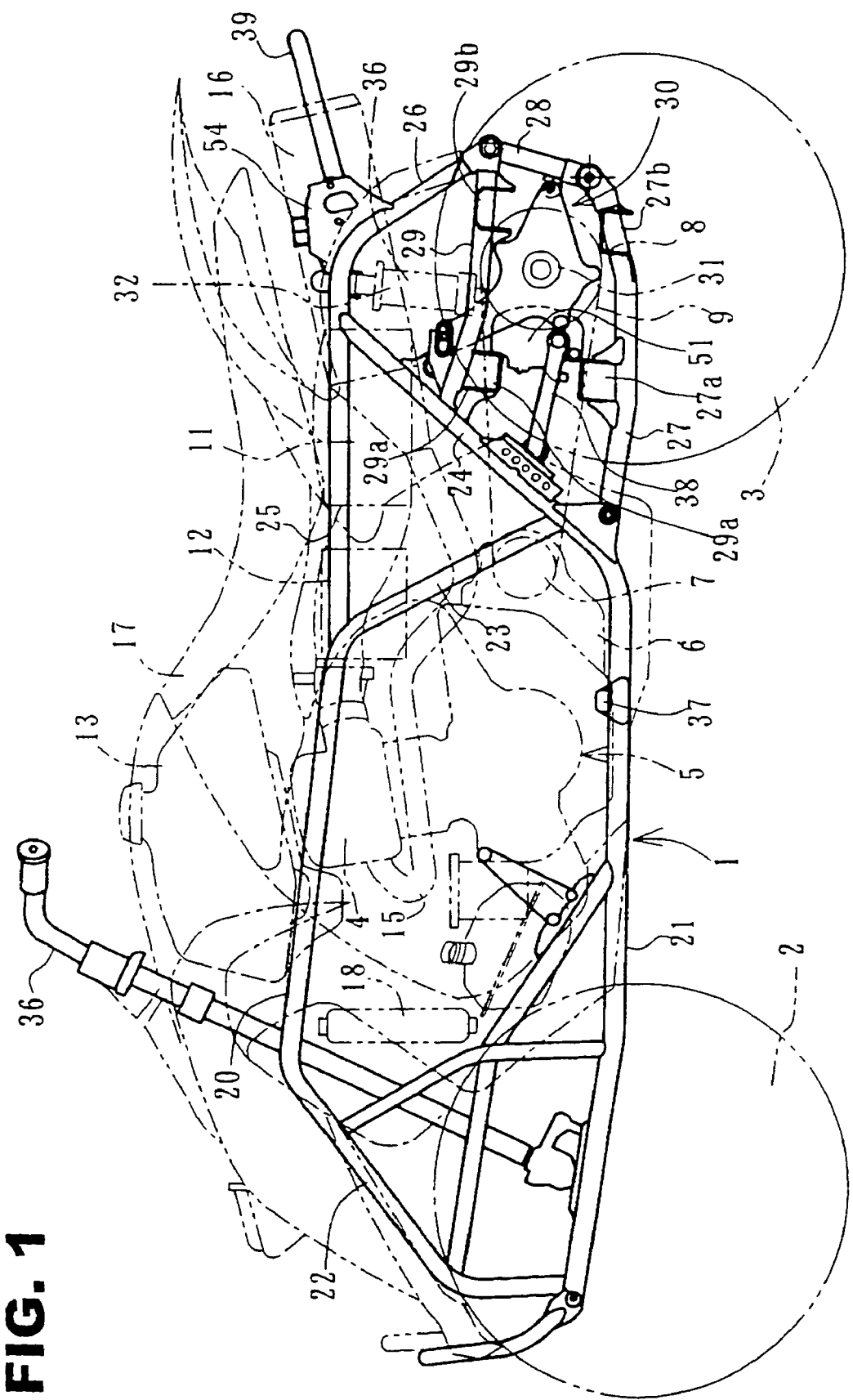
FIG. 1 is a side view of an essential part of a buggy vehicle according to an embodiment.

FIG. 1 is a left-hand side view of an essential portion of a four-wheeled buggy vehicle according to an embodiment. This four-wheeled buggy vehicle is a buggy type irregular terrain running vehicle. The vehicle has a pair of left and right front wheels 2 and rear wheels 3 at the front and the rear, respectively, of a body frame 1. The wheels are low-pressure balloon tires with a relatively large diameter.

An engine 5 with a forward tilting cylinder 4 is mounted at an almost-middle position of the body frame 1. A crankcase 6 constituting a lower portion of the engine 5 also serves as a transmission case. The crankcase 6 is provided with a driving sprocket 7 at its rear portion. A chain 9 is spanned between the driving sprocket 7 and a driven sprocket 8 provided on the side of the rear wheel so as to chain drive the rear wheel 3. The rear wheel 3 is suspended by the rear portion of the vehicle body through the double wishbone type suspension.

An exhaust pipe 15 is joined at its proximal part to the front part of a cylinder head. The exhaust pipe 15 extends along the side of the cylinder 4 and joins with a muffler 16 disposed at the rear part of the vehicle body. The figure also shows an air cleaner 11, a battery 12, a fuel tank 13, and a seat 17.

The body frame 1 includes an upper frame 20, a lower frame 21, a front down frame 22, and a rear down frame 23. The upper and lower frames 20, 21 extend horizontally almost-parallel to each other and backward and forward. The front down frame 22 is formed by bending the front part of the upper frame 20 so as to extend forward and obliquely downward. The rear down frame 23 is formed by bending the rear part of the upper frame 20 so as to extend rearward and obliquely upward and pass the back of the engine 5. Thus, they are joined to one another to form a closed loop as viewed from the side.

The rear part of the lower frame 21 is bent at a position near the lower end of the rear down frame 23 to form a rear frame 24 which extends rearward and obliquely upward. The rear end of the rear frame 24 is joined to the longitudinally intermediate portion of a seat rail 25. The seat rail 25 extends almost-horizontally backward from the vicinity of the joint between the rear end of the upper frame 20 and the rear down frame 23.

The rear part of the seat rail 25 is formed as an overhung part 26 which extends further rearward from a portion to which the upper end of the rear frame 24 is joined, and bends obliquely downward. In addition, the overhung part 26 is connected to the rear end of a lower arm support pipe 27 via a vertical pipe 28. The lower arm support pipe 27 extends rearward from the vicinity of the bent portion between the rear part of the lower frame 21 and the rear frame 24 and has a rear end bending upward and joining to the vertical pipe 28.

An upper arm support pipe 29 is spanned between the joint between the vertical pipe 28 and overhung part 26, and a vertically intermediate portion of the rear frame 24 in such a manner as to extend above and almost-parallel to the lower arm support pipe 27. In order to support arm members for the double wishbone type rear wheel suspension, stays 27*a*, 27*b* are attached to lower arm support pipe 27 and stays 29*a*, 29*b* are attached to the upper arm support pipe 29.

A final case 30 constituting a transmission system is supported between and by the lower arm support pipe 27 and the upper arm support pipe 29. A rear wheel axle 31 extends left-wise and right-wise from the final case 30 and joins at its ends to the rear wheels 3. A rear cushion 32 of the rear wheel suspension is also provided.

Figure 2:
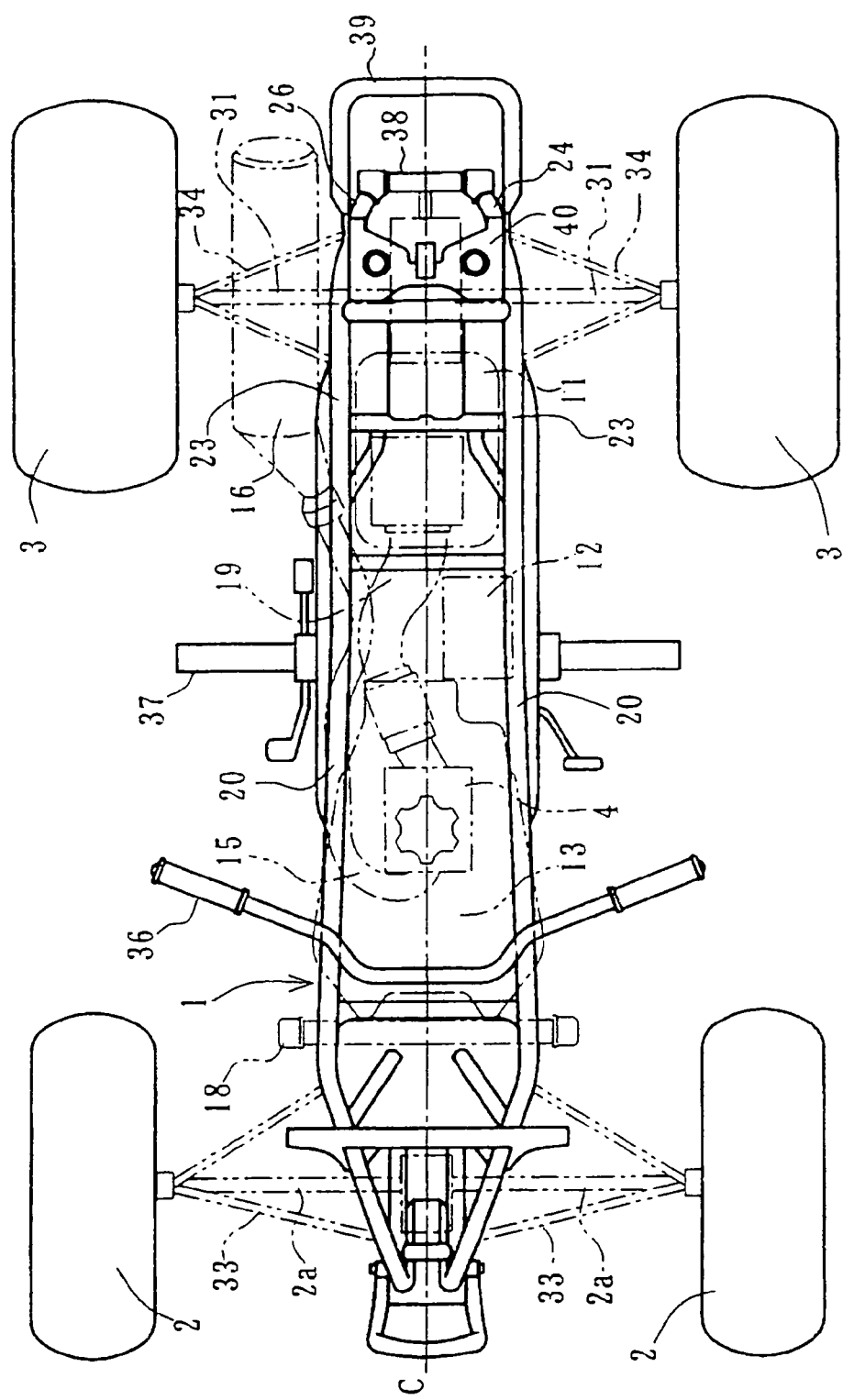
FIG. 2 is a plan view thereof.

FIG. 2 is a plan view of the body frame 1. A double wishbone type front wheel suspension is provided for the front wheel 2. Shown are an upper arm 33 of the front suspension for a front wheel axle 2*a*, and an upper arm 34 of the rear wheel suspension for the rear wheel axle 31. These components are each depicted schematically. The upper arms 33 and 34 are upper components of the upper and lower suspension arms provided for the double wishbone type suspension and lower side lower arm are omitted in the figure. The front wheels 2 and rear wheels 3 are independently suspended by the vehicle body on the left and right sides thereof.

The configuration of the body frame 1 described with reference to FIG. 1 as viewed from the side is provided as a symmetrical pair with a vehicle body center C disposed therebetween. The left and right components are connected by a plurality of cross members to unite the entire components. Members constituting the body frame 1 are steel pipes or the like. FIG. 2 also shows a handlebar 36, a step 37, a cross pipe 38 connecting the lower ends of the left and right overhung parts 26, and a carrier pipe 39.

Figure 3:
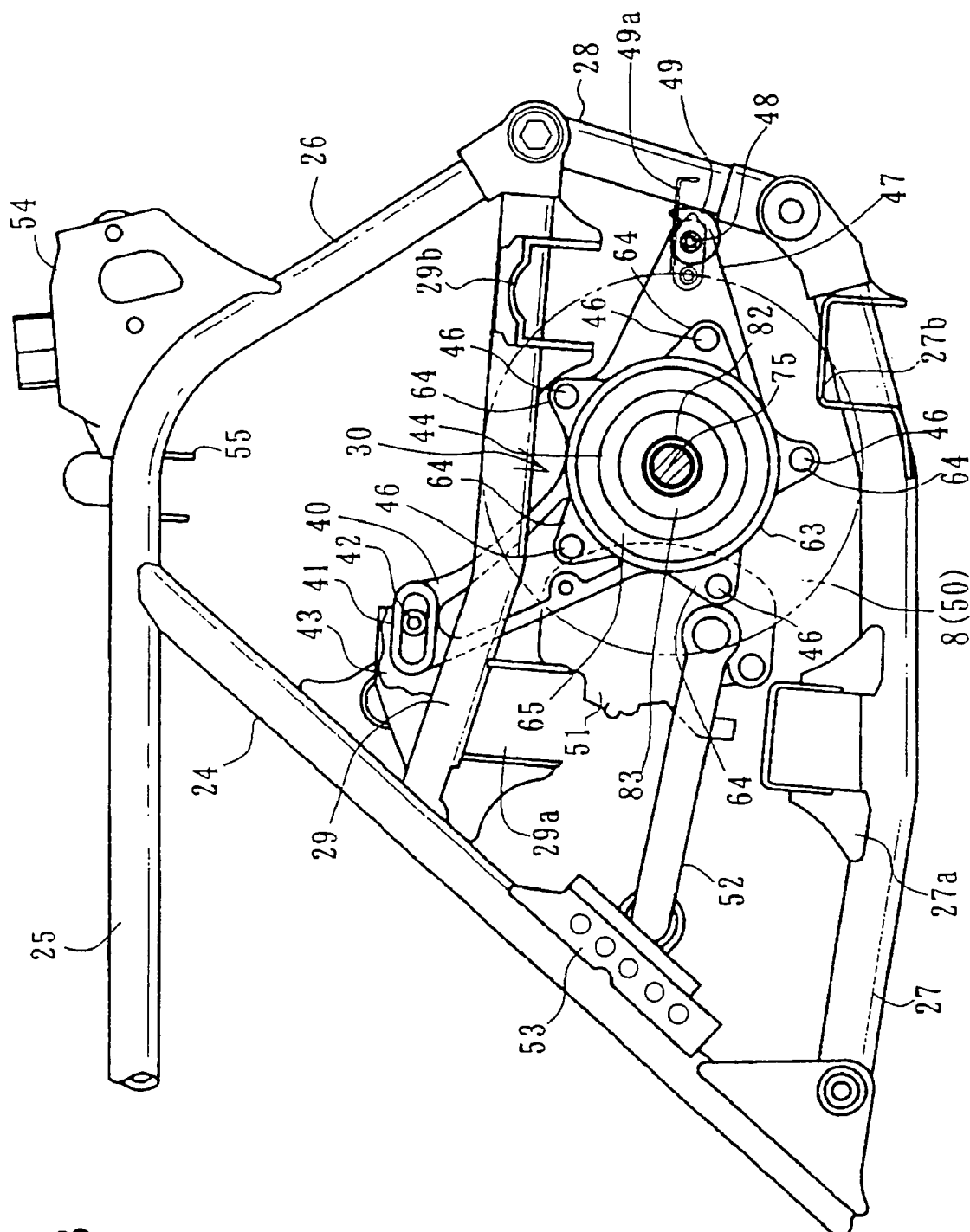
FIG. 3 is an enlarged view illustrating the rear portion of a vehicle body.

FIG. 3 is an enlarged side view of the rear portion of the body frame. The final case 30 is disposed between left and right upper arm support pipes 29 and a lower arm support pipe 27. A front mounting arm 40 is disposed on the front and upper side of the final case 30 so as to extend obliquely upward and has a boss 41 formed at its distal end. The front mounting arm 40 is mounted to a bracket 43 provided at the front end of the upper arm support pipe 29 by a support stem 42 passing an oval hole formed in the boss 41. Thus, the support position can be adjustably moved in a back-and-forth direction.

On the left side surface of the final case 30, a separate or independent holder 63 is removably attached to attachment bosses 64 with bolts 46 so as to hold a bearing 65 supporting an outer race of a left-hand joint described later. The attachment bosses 64 project from the outer circumference of the separate holder 63. In this embodiment, the attachment bosses 64 are circumferentially provided at regular intervals to each coincide with the vertex of a regular pentagon. Also the final case 30 is provided with attachment bosses 64 so as to overlap the corresponding attachment bosses 64.

A bearing holder 44 having a diameter smaller than that of the separate holder 63 is provided coaxially therewith at the central portion of the final case 30. In addition, the bearing holder 44 is disposed on the inner circumferential side of the separate holder 63. A bearing 83 carried by the bearing holder 44 supports the joint-part shaft 82 of a right-hand joint. The joint-part shaft 82 is cylindrical and receives therein a rod-like joint-part shaft 75 of a left-hand joint in a fittable manner.

A rear attachment arm 47 is formed at the rear part of the final case 30 to project outward from the bearing holder 44. The rear attachment arm 47 is coupled at its end to a cam type adjuster 49 through a support stem 48. The adjuster 49 is turnably supported by the vertical pipe 28 via a stay 49*a*. The adjuster 49 is turned to thereby adjust the position of the support stem 48 in a back-and-forth direction. Thus, the adjuster 49 serves as a chain adjuster to vary the tension of the chain 9.

A brake disk 50, which has substantially the same diameter as that of the driven sprocket 8, overlaps the driven sprocket 8 and is supported coaxially with and by the final case 30 from the right-hand side. The brake disk 50 is braked by a brake caliper 51. The driven sprocket 8 and brake disk 50 are overlapped by the stays 27*b*, 29*b*, which are part of the support portion of the suspension arm, so as to be partially covered from the outside as viewed from the side.

A bracket 53 is attached to the rear frame 24 and adapted to support the front end of the stabilizer 52. A support bracket 54 is provided for the carrier, and a bracket 55 is adapted to support the upper end of the rear cushion 32 and located at the boundary between the seat rail 25 and the overhung part 26.

Figure 4:
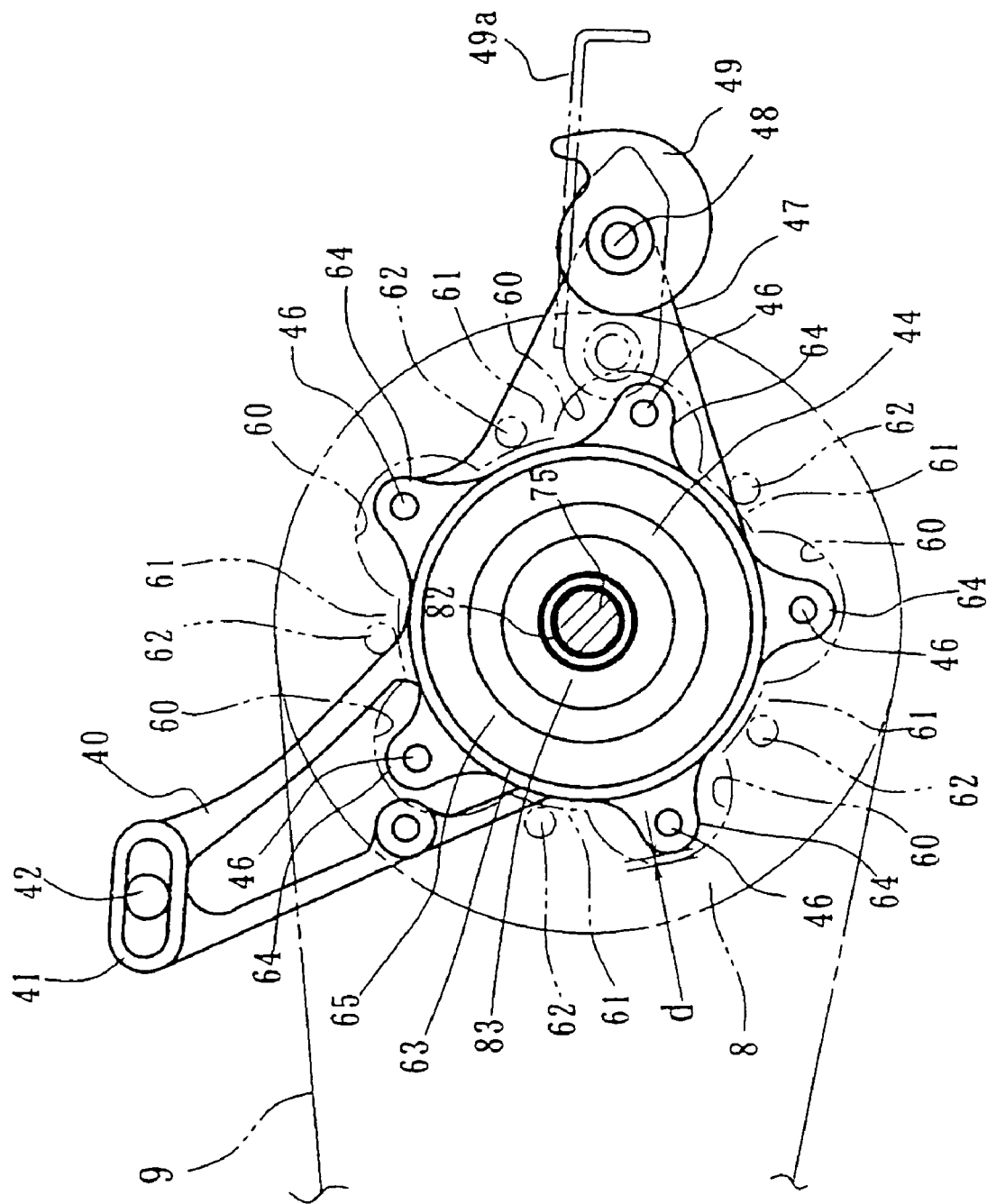
FIG. 4 illustrates the relationship between a separate holder and a driven sprocket.

FIG. 4 illustrates the relationship between the driven sprocket 8 and the final case 30. The driven sprocket 8 is shaped like a doughnut and formed with almost-semicircular arc notches 60 in its inner circumferential portion. The notches 60 are circumferentially arranged at regular intervals to each curve radially outwardly, so that the inner circumferential space presents an almost-petal-like appearance as a whole.

The notches 60 have the same number as that of the attachment bosses 64 and are formed at the same intervals as the attachment bosses 64. The notches are formed at respective positions corresponding to the vertexes of a regular pentagon in the present embodiment. The notches 60 are larger than the attachment bosses 64 so that the entire attachment bosses 64 are received inside the notches 60 as viewed from the side. In addition, the bottom of each notch 60 and the vertex of each attachment boss 64 are arranged to define a clearance d, whereby the bolt 46 can be attached and detached through the notch 60.

A portion between adjacent notches 60 serves as an attachment portion 61 which protrudes toward the center side. This portion 61 is used to removably mount the driven sprocket 8 to an attachment flange provided in a left-hand joint described later by bolts 62 or the like.

In the embodiment shown in the figure, the five notches 60 and five attachment portions 61 are formed to be alternately contiguous to each other in a circumferential direction. Consequently, an almost-petal-like opening is formed as a whole in the inner circumferential portion of the driven sprocket 8. This opening composed of the notches 60 and attachment portions 61 is called a petal-like through-hole. In this case, the notch 60 corresponds to a petal part and the five notches 60 present five petal-like parts.

The inner circumferential part of each attachment portion 61 is located on the concentric circle of the driven sprocket 8. The concentric circle is the minimum diameter part of the petal-like through-hole. The entire separate holder 63 is received inside the concentric circle as viewed from the side in FIG. 4. The number of the petal parts (notches 60), five, is equal to that of the attachment bosses 64 serving as the fastening parts of the separate holders 63. In addition, each of the attachment bosses 64 is formed smaller than the notch 60 so as to be received inside the corresponding one of the notches 60.

Figure 5:
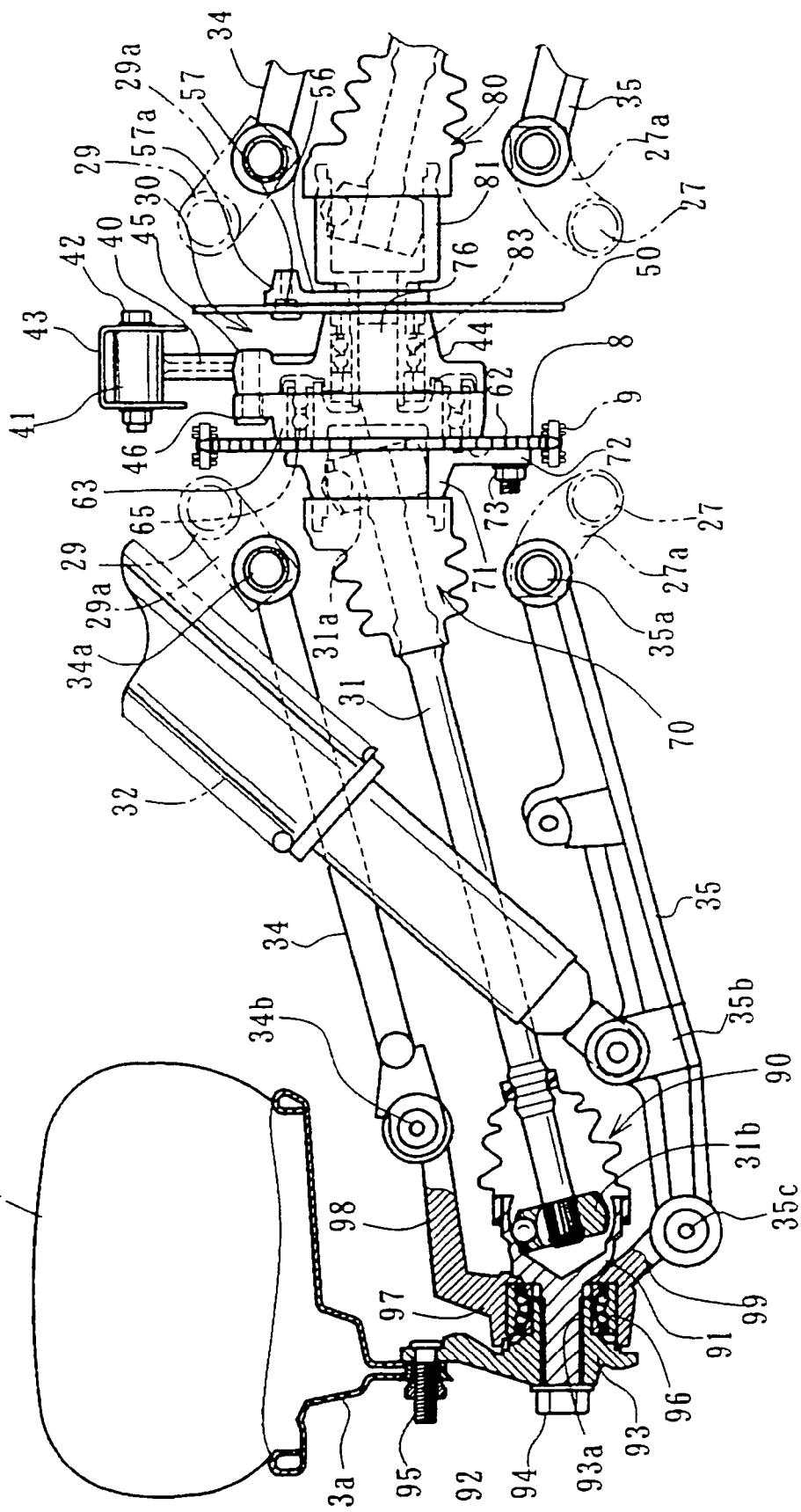
FIG. 5 illustrates a rear wheel suspension structure as viewed from the back of the vehicle body.

FIG. 5 is a partial cut-away view mainly illustrating the left-hand rear wheel suspension structure as viewed from the rear of the vehicle body. The final case 30 rotatably supports a left-hand joint 70 via the separate holder 63 on the left side thereof. The left-hand joint 70 is formed with a mounting flange 72 on the outer circumferential part thereof. The driven sprocket 8 is fastened to the mounting flange 72 with bolts 62 and nuts 73.

The final case 30 rotatably supports the right-hand joint 80 on the right side thereof. The right-hand joint 80 is formed on its outer circumference part with a flange member 56, which rotates integrally with an outer race 81 described later. A brake disk 50 is fastened to a flange 57 of the flange member 56. The right-hand joint 80 and the brake disk 50 are arranged coaxially with the left-hand joint 70 and the driven sprocket 8.

An inner race 31a is formed at one end of the rear wheel axle 31. The inner race 31a is fitted into the outer race 71 of the left-hand joint 70 so that it can rotate integrally with and swing relative to the left-hand joint 70. The rear wheel axle 31 extends from the left-hand joint 70 outwardly and obliquely downwardly and terminates at its leading end, which serves as an inner race 31b and is coupled to the rear wheel side joint 90.

The rear wheel side joint 90 is configured such that a hub shaft 92 which extends from the center of a cup-like outer race 91 adapted to receive the inner race 31b and projects outwardly passes centrally through a hub 93 and is spline-coupled thereto. In addition, a projecting end of the hub shaft 92 is fastened to the hub 93 by a nut 94 so that the hub shaft 92 can be rotated together with the hub 93. The outer circumferential part of the hub 93 is united to a rim part 3a of the rear wheel 3 with bolts 95.

The hub shaft 92 passes through the inside of a boss part 93a formed in the middle part of the hub 93. A knuckle 97 is supported by the outer circumferential part of the hub 93 through a bearing 96. The knuckle 97 is provided at its upper and lower portions with an upper knuckle arm 98 and a lower knuckle arm 99, respectively, which extend inside the vehicle body.

The upper arms 34 and lower arms 35 each substantially formed in a V-shape are provided above and below, respectively, the rear wheel axle 31 so as to be parallel to each other. The upper arms 34 have one ends 34a on the inner side of the vehicle body, which are swingably supported by stays 29a, 29b (FIG. 3) of the upper arm support pipe 29. In addition, the upper arms 34 have the other ends 34b on the outer side of the vehicle body, which are rotatably connected to the upper knuckle arm 98 by means of a shaft.

The lower arms 35 have one ends 35a on the inner side of the vehicle body, which are swingably supported by stays 27a, 27b (FIG. 3) of the lower arm support pipe 27. The lower arms 35 each have an attachment part 35b at its intermediate portion to which the lower end of the rear cushion 32 is turnably connected by means of a shaft. In addition, the lower arms 35 have the other ends 35c on the outer side of the vehicle body, which are turnably connected to the lower knuckle arm 99 by means of a shaft.

In this way, the rear wheel 3 is driven by the rear wheel shaft 31 and can be freely, vertically moved about the supporting points of the one ends 34a, 35a. In this case, the knuckle 97, the upper arm 34 and lower arm 35 serve as a parallelogrammatic link mechanism; therefore, the rear wheel 3 vertically moves in a parallel manner.

The relationship between the rear wheel axle 31 and the rear wheel 3 and the structures of the upper arms 34 and the lower arms 35 on the right side of the vehicle body are the same as those on the left side thereof; therefore, detailed illustration and description are omitted. Thus, the left and right rear wheels 3 are independently suspended by the left and right portions, respectively, of the vehicle body.

Figure 6:
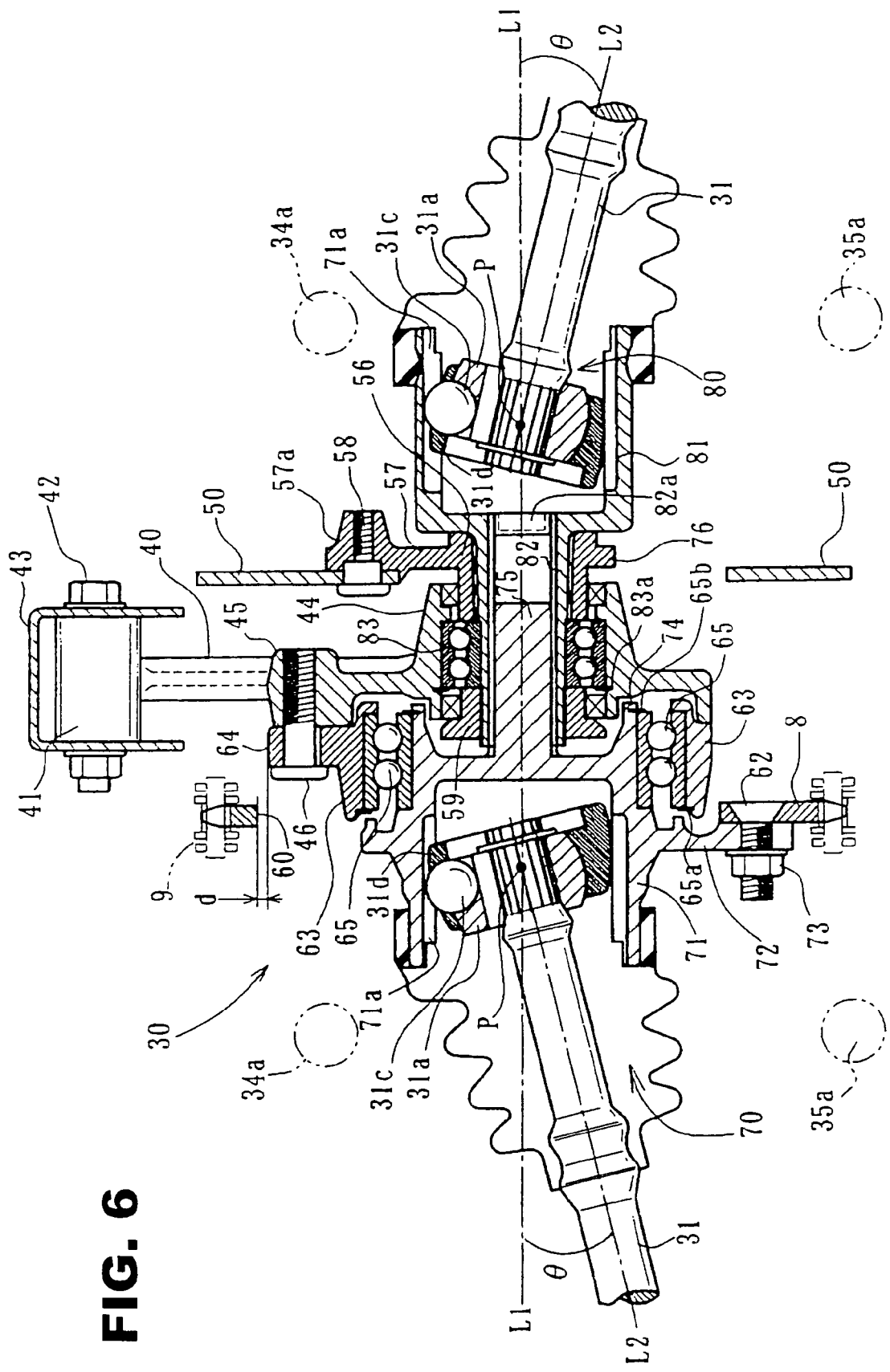
FIG. 6 is a transverse cross-sectional view of a final case and joints.

FIG. 6 illustrates a cross-sectional structure of the left-hand joint 70 and right-hand joint 80 of the final case 30, taken along the rear wheel axle 31. The bearing holder 44 of the final case 30 is provided with bosses 45 equally spaced at its outer circumferential portion. The boss portions 64 of the separate holder 63 overlap the bosses 45, whereby the bosses 45 are fastened to the boss portions 64 with the bolts 46.

The separate holder 63 is a member adapted to support the bearing 65 of the left-hand joint 70. A bearing part 74 of the left-hand joint 70 is fitted into and supported by the inner circumferential side of the separate holder 63 via the bearing 65. The bearing 65 is located on the bearing part 74 so as to be positioned in a thrust direction by means of clips 65a and 65b. The outer race 71 projects from the bearing part 74 continuously outwardly and is formed with a serration groove 71a on the inner circumferential surface thereof. Balls 31c of the inner race 31a are fitted into the serration groove 71a. The balls 31c are aligned by a gauge 31d. This joint structure provides a known constant-velocity joint.

The mounting flange 72 is formed on the outer circumferential part of the outer race 71 so as to project radially outwardly. The mounting flange 72 is overlapped by the driven sprocket 8 from the inside of the vehicle body so that they are integrally fastened to each other with the bolts 62 and nuts 73. Since the driven sprocket 8 is engaged with the chain 9, the outer race 71 can be driven and rotated by the chain 9 via the bearing 65 with respect to the separate holder 63 attached to the final case 30.

The axial center part of the outer race 71 is solid and rod-like and serves as a joint-part shaft 75. The joint-part shaft 75 is formed with spline on its outer surface and integrally projects inward of the vehicle body. A cylindrical joint shaft 82 integrally extends from the outer race 81 and is formed with a spline groove on the inner surface thereof. The joint-part shaft 75 is fitted into a shaft hole of the joint-part shaft 82. Thus, they are spline coupled to each other in an integrally rotatable manner. Because of being solid and rod-like, the joint-part shaft 75 is of a male type whereas because of being tubular, the joint-part shaft 82 is of a female type. Both the joint-part shafts 75 and 82 are directly coupled to each other due to male-female coupling. Reference numeral 82a denotes a cap fitted into a shaft hole end of the joint-part shaft 82.

The bearing 83 is fitted into the inner circumference of the bearing holder 44 included in the final case 30 to rotatably support the outer circumference of the joint-part shaft 82. Thus, the outer races 71 and 81 are journaled by the bearings 65 and 83, respectively, and drivingly rotated by the chain 9. The bearing 83 is positioned by a positioning part provided in the bearing holder 44 and locked by circlips 83a.

The joint-part shaft 82 is provided with spline on its outer circumference. The proximal portion of the flange member 56 is spline coupled to the outer circumference so as to be externally fitted to between a stepped part of the outer race 81 and the bearing 83. Thus, the outer race 81 is positioned by the bearing 83. The joint-part shaft 82 is externally threaded on the outer circumference thereof, to which a nut 59 is fastened. The outer race 81 and the bearing 83 are positioned and fastened by screwing up the nut 59.

A boss 57a is provided at the leading end of the flange 57, of the flange member 56, extending radially outer-circumferentially. The inner circumferential part of the brake disk 50 is removably fastened to the boss 57a from the inside of the vehicle body by means of a bolt 58. The brake disk 50 is coaxially arranged to be spaced laterally apart from the driven sprocket 8 with the final case 30 interposed therebetween. The driven sprocket 8 is supported by the left-hand joint 70 whereas the brake disk 50 is supported by the right-hand joint 80. That is to say, the driven sprocket 8 and the brake disk 50 are supported by respective different members.

The driven sprocket 8 and the brake disk 50 are each located inside a corresponding one end 34a of the upper arm and a corresponding one end 35a of the lower arm. The one ends 34a and 35a are the body frame side supporting points of the upper arms and lower arms; therefore, they indicate the vehicle-width-wise positions of the body frame. The driven sprocket 8 and brake disk 50 are disposed inside the body frame. This means that the body frame functions as a guard member for the driven sprocket 8 and brake disk 50.

The joint angle θ of the rear wheel axle 31 is an angle formed between a horizontal line L1 and an axial line L2 of the rear wheel axle. It is assumed that a distance between the left and right rear wheels 3, 3, wheel tread, is constant. If a point of the intersection of the line L1 with the line L2 is a joint center P, the joint angle θ is reduced as the distance between the left and right joint centers P, P is smaller.

Next, the function of the present embodiment will be described. When the driving sprocket 7 of the engine 5 drivingly rotates the driven sprocket 8 via the chain 9, the driven sprocket 8 drivingly rotates the outer race 71 via the bearing 65 with respect to the separate holder 63 attached to the final case 30. This rotation of the outer race 71 drivingly rotates the left-hand rear wheel axle 31 which engages the inside of the outer race 71 in an integrally rotatable manner.

The joint-part shaft 75 which is a male-shape part of the left-hand joint 70 is fitted into the joint-part shaft 82 which is a female-shape part of the right-hand joint 80 for spline coupling. In addition, the joint-part shaft 82 is rotatably supported by the bearing 83 of the bearing holder 44 provided on the final case 30. Thus, the left and right outer races 71, 81 are drivingly rotated integrally and simultaneously to rotate the left and right rear wheel axles 31, respectively, at equal speed.

As described above, the outer races 71 and 81 are directly coupled to each other through the joint-part shafts 75, 82; therefore, it is possible to eliminate the intervention of the conventional tubular member, thereby reducing the number of component parts. In addition, the lateral distance between the joint centers P, P can be reduced. Further, since the joint center is located inside the body frame, the lateral distance between the joint centers P-P can be further reduced.

For this reason, if the wheel tread is constant, the joint angle θ can be reduced according to the reduced lateral distance between the joint centers P-P, ensuring the sufficient wheel stroke.

When the suspension device is assembled, respective sets of components associated with the left-hand joint 70 and the right-hand joint 80 are first assembled separately from each other. More specifically, the left-hand joint 70 is temporarily assembled by fitting the bearing part 74 into the inside of the bearing 65 for the separate holder 63. Similarly, the right-hand joint 80 is temporarily assembled by inserting the joint-part shaft 82 fitted externally to the flange member 56 into the inside of the bearing 83 for the bearing holder 44 and fastening the leading end of the joint part of shaft 82 with the fastening member 59.

Next, the joint-part shaft 75 of the left-hand joint 70 is fitted into the shaft hole of the joint-part shaft 82 for spline coupling. In addition, the attachment boss 45 of the final case 30 and the attachment boss 64 of the separate holder 63 are overlapped with each other and fastened to each other by means of the bolts 46. Thus, the final case 30 can be generally assembled. In this case, the left-hand and right-hand joint-part shafts 75 and 82 are formed like a male-female relationship so as to be fitted to each other, whereby the left-hand and right-hand outer races 71 and 82 are coupled to each other. Thus, assembly can be simplified, mass productivity can be enhanced and the left-hand and right-hand outer races 71 and 82 can be securely coupled to each other.

The driven sprocket 8 is provided with the notches 60 formed like petals, the number of the notches 60 is the same number as that of the attachment bosses 45 and the notches 60 are formed larger than the attachment bosses 45. While the driven sprocket 8 remains attached to the outer race 71, the attachment bosses 64 of the separate holder 63 can be attached and detached to and from the attachment bosses 45 of the final case 30 by means of the bolts 46. Therefore, the separate holder 63 can be easily attached and detached, the assembling performance thereof can be improved and mass productivity can be enhanced. In addition, while the driven sprocket 8 remains attached, the separate holder 63 can be attached and detached. Therefore, maintenance performance and mass productivity can be enhanced.

Furthermore, the driven sprocket 8 and the brake disk 50 are supported by respective different members, that is, by the separate holder 63 and the bearing holder 44 of the final case 30, respectively. Therefore, deformation of the attachment flange 72 adapted to support the driven sprocket 8, resulting from the chain's tensile force has no effect on the brake disk 50. Thus, a part for supporting each of the driven sprocket 8 and brake disk 50 needs less rigidity, which can reduce the weight of the joints 70 and 80.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A joint structure for an independent suspension, comprising:
a transmission system final case supported by a body frame;
left-hand and right-hand driving wheels held by the body frame through left-hand and right-hand suspension arms, respectively;
wherein the final case includes:
a driven portion to which a driving force of an engine is transmitted;
joints adapted to transmit the driving force from the driven portion to left-hand and right-hand axles, each joint having an outer race adapted to connect an end of the axle therewith swingably; and
a left-hand joint-part shaft and a right-hand joint-part shaft formed as separate parts, one of which extends from an axial center part of one of the outer races toward the other of the joint-part shafts,
wherein the left-hand and right-hand outer races are directly coupled to each other by coupling the respective joint-part shafts with each other, and
wherein the left-hand and right-hand joint-part shafts are formed such that one is a male member and the other is a female member and are coupled to each other through a male-female fitting structure,
wherein one of the respective outer races of the left-hand and right-hand joints holds a brake disk and the other of the outer races holds a driven sprocket.

2. A joint structure for an independent suspension, comprising:
a transmission system final case supported by a body frame;
left-hand and right-hand driving wheels held by the body frame through left-hand and right-hand suspension arms, respectively;
wherein the final case includes:
a driven sprocket to which a driving force of an engine is transmitted;
joints adapted to transmit the driving force from the driven sprocket to left-hand and right-hand axles, each joint having an outer race adapted to connect an end of the axle therewith swingably; and
a left-hand joint-part shaft and a right-hand joint-part shaft from an axial center part of one of the outer races toward the other of the joint-part shafts,
wherein the left-hand and right-hand outer races are directly coupled to each other by coupling the respective joint-part shafts with each other,
the left-hand outer race and the right-hand outer races being journaled, respectively, by bearing rings having different diameters,
wherein the right-hand joint is formed on its outer circumference part with a flange member, which rotates integrally with the right-hand outer race, and a brake disk is fastened to the flange member.

3. The joint structure for an independent suspension according to claim 1, further comprising a separate holder adapted to support a bearing of the left-hand joint.

4. The joint structure for an independent suspension according to claim 3, further comprising a bearing part of the left-hand joint that is fitted into and supported by an inner circumferential side of the separate holder via the bearing of the left-hand joint,
wherein the left-hand outer race projects from the bearing part continuously outwardly and is formed with a serration groove on an inner circumferential surface thereof, and balls of an inner race are fitted into the serration groove, thereby forming a constant-velocity joint structure.

5. The joint structure for an independent suspension according to claim 1, further comprising a mounting flange formed on an outer circumferential part of the left-hand outer race so as to project radially outwardly, the driven portion being integrally fastened to the mounting flange.

6. The joint structure for an independent suspension according to claim 1, wherein the right-hand joint is formed on its outer circumference part with a flange member, which rotates integrally with the right-hand outer race, and a brake disk is fastened to the flange member.

7. The joint structure for an independent suspension according to claim 1, wherein the joint-part shaft of the right-hand joint is supported by the final case via a bearing of the right-hand joint.

8. The joint structure for an independent suspension according to claim 1, wherein the joint-part shafts of the right-hand and left-hand joints are surrounded by a bearing of the right-hand joint.

9. The joint structure for an independent suspension according to claim 1, wherein the driven portion includes a driven sprocket engaging with a chain which is attached to the left-hand joint, and a separate holder for supporting a bearing of the left-hand joint is detachably attached to the final case.

10. A joint structure for an independent suspension, comprising:
a transmission system final case supported by a body frame;
left-hand and right-hand driving wheels held by the body frame through left-hand and right-hand suspension arms, respectively;
wherein the final case includes:
a driven sprocket to which a driving force of an engine is transmitted;
joints adapted to transmit the driving force from the driven sprocket to left-hand and right-hand axles, each joint having an outer race adapted to connect an end of the axle therewith swingably; and
a left-hand joint-part shaft and a right-hand joint-part shaft formed a separate parts, one of which extends from an axial center part of one of the outer races toward the other of the joint-part shafts,
wherein the left-hand and right-hand outer races are directly coupled to each other by coupling the respective joint-part shafts with each other, and
wherein the left-hand and right-hand joint-part shafts are formed such that one is a male member and the other is a female member and are coupled to each other through a male-female fitting structure,
further comprising a mounting flange formed on an outer circumferential part of the left-hand outer race so as to project radially outwardly, the driven sprocket being integrally fastened to the mounting flange.

11. The joint structure for an independent suspension according to claim 10, wherein one of the respective outer races of the left-hand and right-hand joints holds a brake disk and the other of the outer races holds a driven sprocket.

12. The joint structure for an independent suspension according to claim 10, further comprising a separate holder adapted to support a bearing of the left-hand joint.

13. The joint structure for an independent suspension according to claim 12, further comprising a bearing part of the left-hand joint that is fitted into and supported by an inner circumferential side of the separate holder via the bearing of the left-hand joint, wherein the left-hand outer race projects from the bearing part continuously outwardly and is formed with a serration groove on an inner circumferential surface thereof, and balls of an inner race are fitted into the serration groove, thereby forming a constant-velocity joint structure.

14. The joint structure for an independent suspension according to claim 2, further comprising a mounting flange formed on an outer circumferential part of the left-hand outer race so as to project radially outwardly, the driven sprocket being integrally fastened to the mounting flange.

15. The joint structure for an independent suspension according to claim 10, wherein the right-hand joint is formed on its outer circumference part with a flange member, which rotates integrally with the right-hand outer race, and a brake disk is fastened to the flange member.

16. The joint structure for an independent suspension according to claim 10, wherein the joint-part shaft of the right-hand joint is supported by the final case via a bearing of the right-hand joint.

17. The joint structure for an independent suspension according to claim 10, wherein the joint-part shafts of the right-hand and left-hand joints are surrounded by a bearing of the right-hand joint.

18. The joint structure for an independent suspension according claim 2, wherein one of the respective outer races of the left-hand and right-hand joints holds a brake disk and the other of the outer races holds a driven sprocket.

* * * * *